US010808427B1

(12) United States Patent
Jonak et al.

(10) Patent No.: US 10,808,427 B1
(45) Date of Patent: *Oct. 20, 2020

(54) SMART LOCK BOX

(71) Applicant: United Services Automobile Association (USAA), San Antonio, TX (US)

(72) Inventors: Sumita T. Jonak, San Antonio, TX (US); Tyler Caro, San Antonio, TX (US); Emily Kathleen Krebs, San Antonio, TX (US); Maland Keith Mortensen, San Antonio, TX (US); Gabriel C. Fernandez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,984

(22) Filed: Jun. 8, 2020

Related U.S. Application Data

(63) Continuation of application No. 16/051,601, filed on Aug. 1, 2018, now Pat. No. 10,745,943.
(Continued)

(51) Int. Cl.
*G05B 19/00* (2006.01)
*G05B 23/00* (2006.01)
*G06F 7/00* (2006.01)
*G06F 7/04* (2006.01)
*G06K 19/00* (2006.01)
*G08B 29/00* (2006.01)
*G08C 19/00* (2006.01)
*H04B 1/00* (2006.01)
*H04B 3/00* (2006.01)
(Continued)

(52) U.S. Cl.
CPC .......... *E05B 67/02* (2013.01); *E05B 19/0005* (2013.01); *G07C 9/00571* (2013.01); *G07C 9/00896* (2013.01); *G07C 9/28* (2020.01); *G07C 2009/00769* (2013.01); *G07C 2009/00841* (2013.01)

(58) Field of Classification Search
CPC . E05B 67/02; E05B 19/0005; G07C 9/00571; G07C 9/00896; G07C 9/00111; G07C 2009/00769; G07C 2009/00841
USPC ........................................................ 340/5.2
See application file for complete search history.

(56) References Cited

U.S. PATENT DOCUMENTS

2011/0053557 A1 3/2011 Despain
2011/0302405 A1 12/2011 Marlow
(Continued)

*Primary Examiner* — Tanmay K Shah
(74) *Attorney, Agent, or Firm* — Fish & Richardson P.C.

(57) ABSTRACT

A smart lock box system is described. One implementation of the lock box system includes a locking mechanism configured to securely hold a cover over a compartment. The lock box system includes a receiver capable of receiving signals from a user device. The lock box system also includes a processor configured to identify an access message in a received signal, a service to verify that the access message was provided by an authorized party, and cause the locking mechanism to be released in response to verifying that the access message was provided by the authorized party. The open/close events are recorded in a distributed ledger to document which user's device was used to access a given property at a given time. Furthermore, the smart lock box system utilizes a push notification service, based on user device's GPS, to inform owners when to depart/return to the property.

19 Claims, 7 Drawing Sheets

Related U.S. Application Data

(60) Provisional application No. 62/540,440, filed on Aug. 2, 2017.

(51) Int. Cl.

| | |
|---|---|
| ***H04L 9/14*** | (2006.01) |
| ***H04L 9/32*** | (2006.01) |
| ***H04Q 1/00*** | (2006.01) |
| ***E05B 67/02*** | (2006.01) |
| ***G07C 9/00*** | (2020.01) |
| ***E05B 19/00*** | (2006.01) |
| ***G07C 9/28*** | (2020.01) |

(56) References Cited

U.S. PATENT DOCUMENTS

| | | | |
|---|---|---|---|
| 2014/0375422 | A1 | 12/2014 | Huber |
| 2016/0055698 | A1 | 2/2016 | Gudmundsson et al. |

SMART LOCK BOX

CROSS-REFERENCE TO RELATED APPLICATION

This application is a continuation application of and claims priority under 35 U.S.C. § 120 to U.S. application Ser. No. 16/051,601, filed on Aug. 1, 2018, which claims priority under 35 U.S.C. § 119 to U.S. Application Ser. No. 62/540,440, filed on Aug. 2, 2017, and entitled "SMART LOCK BOX," the entire contents of each of which are incorporated herein by reference.

BACKGROUND

A real-estate lock box is a padlock-shaped box that hangs around the doorknob of a residence that is on the market. The device holds the keys to a residence to allow communal access for all real estate agents, buyers, and contractors while continuing to keep the property secure.

Real estate lock boxes are generally secured either with a manual key, a security code, or a swipe card. Some real estate lock boxes allow owners to know when the residence has been accessed.

SUMMARY

Implementations of the present disclosure are generally directed to a smart lock box and methods of using it.

In general, innovative aspects of the subject matter described in this specification can be embodied in a lock box that includes a locking mechanism configured to securely hold a cover over a compartment. The lock box includes a receiver capable of receiving signals from a user device. The lock box also includes a processor configured to identify an access message in a received signal, verify that the access message was provided by an authorized party, and cause the locking mechanism to be released in response to verifying that the access message was provided by the authorized party.

Implementations can optionally include one or more of the following features. Verifying that an authorized party provided the access message can include checking a digital signature included in the access message. Verifying an authorized party provided the access message can include comparing a timestamp in the access message to the current time. The lock box can require a key from two or more user devices, as a form of multi-party authentication, in order to open.

In general, other innovative aspects of the subject matter described in this specification can be embodied in methods that include the act of receiving a request to access a smart lock box from a user device. The methods include the act of verifying that the user of the user device is authorized to access the lock box. The method includes the act of storing an entry on distributed ledger technology indicating that the user has accessed the lock box. The method also includes the act of transmitting a key capable of opening the smart lock box to the user.

Implementations can optionally include one or more of the following features verifying that the user device is authorized to access the lock box can include verifying that the user device is within a predetermined distance from the lock box. Verifying that the user device is authorized to access the lock box can include verifying that the user has scheduled an appointment to view a residence associated with the lock box. The methods can include the acts of determining to send a message to the owner that the owner can depart/return to a residence associated with the lock box and sending a message to the owner. The lock box can require a key from two or more user devices in order to open, as part of quorum-based authentication technology.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Selling a residence can be stressful, especially if someone is still living in the residence. The seller has to keep the residence in a condition that it will be attractive to a potential buyer. The seller is required to leave their residence for a prolonged time (for example, appointments to view a residence are frequently provided in two-hour windows) even though the amount of time required to view the residence is frequently less than thirty minutes. Further, the seller frequently has no way to accurately gauge the level of interest in the property, which can make it more difficult to correctly price the property.

Figure 1:
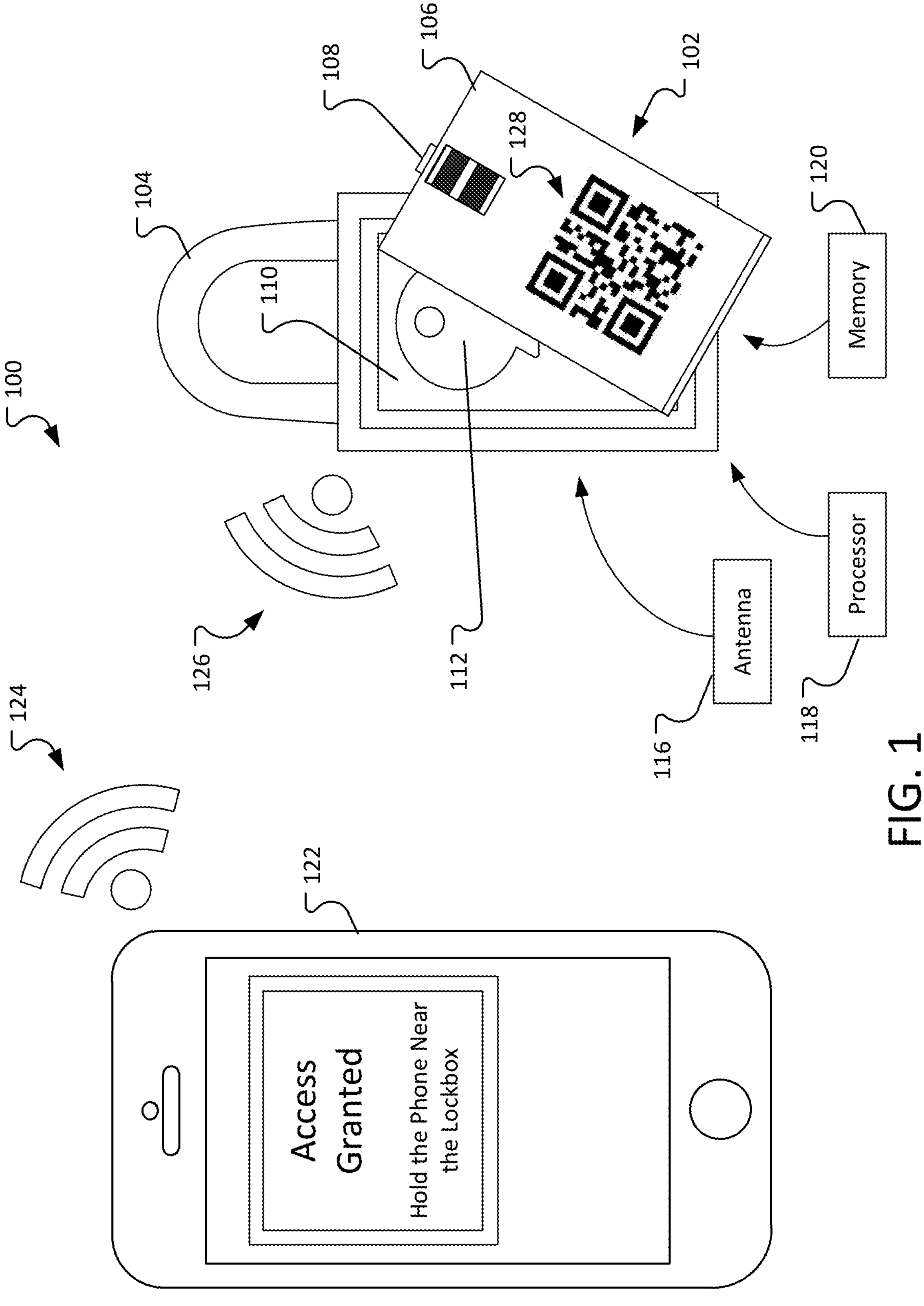
FIG. 1. illustrates an example environment where a smart lock box can be used.

FIG. 1 illustrates an example environment 100 where a smart lock box 102 can be used. The smart lock box 102 can include a locking ring 104. The locking ring 104 can be used to secure the lock box 102, for example, for securing the lock box 102 onto a door handle of a residence.

The lock box 102 includes a door 106. The door 106 can be securely connected to the lock box 102. In some implementations, the door 106 can be attached to the lock box 102 using hinges. In some implementations, the door 106 can be removable from the lock box 102. The door 106 can be secured to the lock box 102 using a latch 108 or other locking mechanism. The latch can be secured so that the door 106 cannot be removed/opened without disengaging a lock. The door 106 can be used to cover a compartment 110 that can be used to store objects, such as a key 112.

In some implementations, the latch 108 can connect to the lock box 102 so moving the latch 108 causes the lock box 102 to open. In some implementations, the mechanism that releases the door 106 from the lock box 102 and thereby allowing the lock box 102 to open, exposing the compartment 110, can be located on the lock box 106. In other implementations, the mechanism that releases the door 106 from the lock box 102 can be located on the door 106.

The lock box 102 can include an antenna 116, for example, for receiving and sending signals using a variety of wireless RF protocols, to include but not limited to BLUETOOTH LOW ENERGY, NEAR FIELD COMMUNICATION (NFC), ZIGBEE (represented by the radio signal icon 126), or other communication mechanism (for example, mechanisms/protocols requiring camera/LED signal, for example, receiving and sending signals via Li-Fi, Visible Light Communication (VLC), or other optical wireless communications, etc.). The lock box 102 can also include a processor 118 for processing signals received through the antenna or optical sensor 116, as discussed further below. The lock box 102 can also include a memory 120. The memory 120 can store a set of instructions that are used by the processor 118 and specify how signals received by the antenna or optical sensor 116 are processed.

The lock box 102 can be opened based on a signal received from a user device 122, for example, a smart phone, a dedicated authentication device, such as a token, etc. The user device 122 sends an authorization signal 124 to the lock box 102. The authorization signal can be received by the user device 122 from a server or other computer system, as discussed below.

The lock box 102 authenticates the signal and, in response to successfully authenticating the signal, opens the lock box 102 allowing the user of the user device 122 to access the key 112.

In some implementations, the lock box 102 can include a Quick Response (QR) code 128, bar code, visible serial number, RFID, NFC, or some other mechanism for identifying the lock box to a server. In some implementations, the lock box 102 can identify itself electronically. In some implementations, the functionality provided by the server can be implemented by a smart contract accessible from the distributed ledger. In some implementations, the user device transmits an identifier (for example, extracted from the QR code, NFC tag, BLE broadcast, etc.) to a server as part of a request to obtain an authorization signal. In some implementations, the server may store information that associates a particular lock box with a particular address, and the user device requests the lock box by referring to the address.

Figure 2:
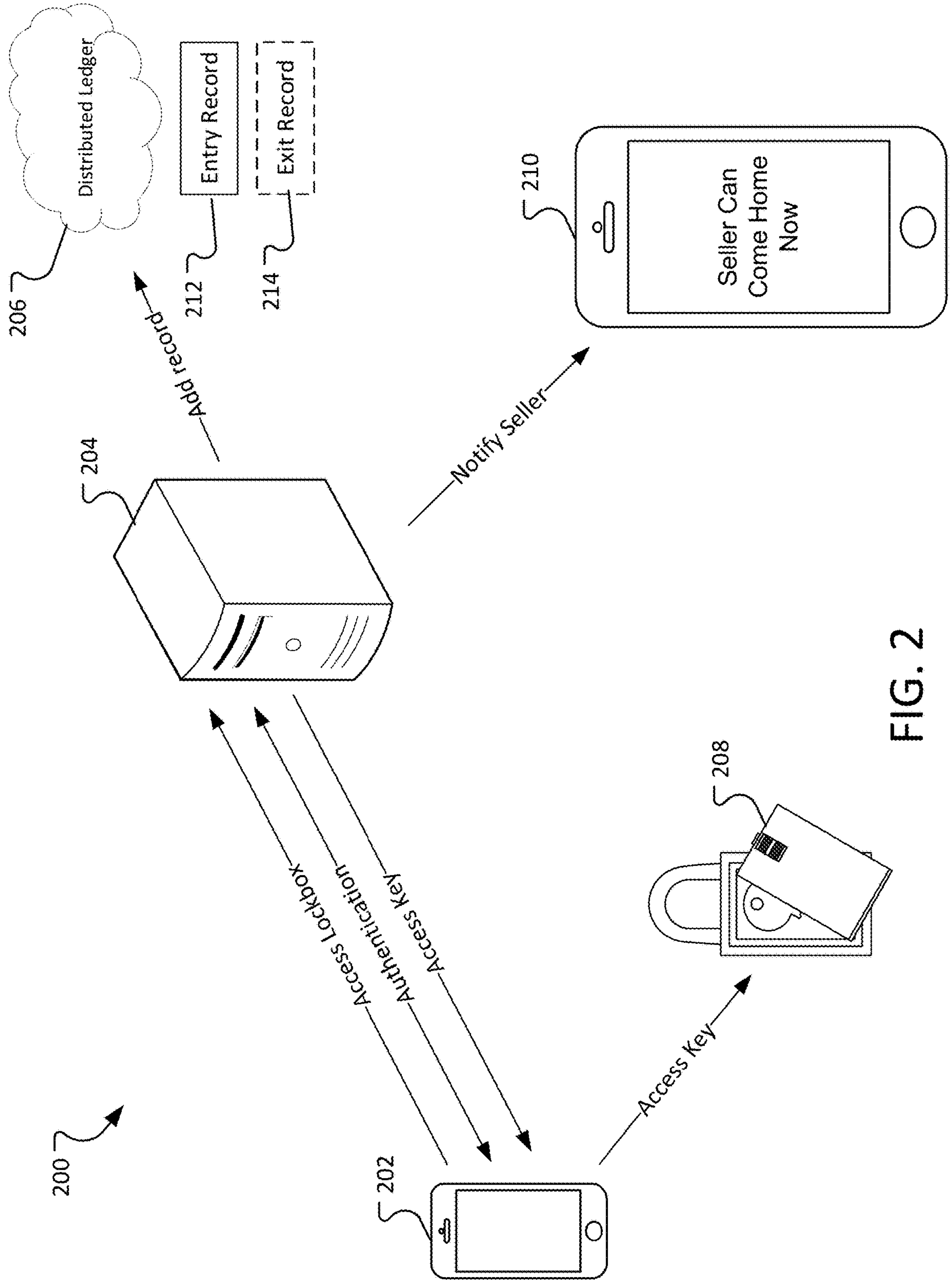
FIG. 2. illustrates a process for accessing a smart lock box.

FIG. 2 illustrates a process for accessing a smart lock box 208. The lock box 208 is associated with a residence or other similar building at the server 204.

A user of the user device 202 requests access to the lock box 208 from a server 204. The server 204 authenticates the user of the user device 202. The server 204 can authenticate the user using, for example, FAST IDENTITY ONLINE (FIDO).

For example, the user device 202 can contain a private key that is protected behind an authentication factor (such as a U2F token or a biometric sensor, for example). The user's biometric data generally does not leave the user's device. Instead, the user device 202 is assigned a public and private key when the user registers with the server 204. The server 204 stores a copy of the public key associated with the user. The private key is stored on the user device 202.

When the user wishes to authenticate with the server 204, the user unlocks the private key stored on the user device 202 (for example, by scanning the user's fingerprint). The private key can be used to sign a challenge sent by the server. The server verifies the authentication result using the public key of the user and thereby authenticates user's signed challenge response.

In some implementations, the server further requires that the user is within a geo-fence area around the lock box. The geo-fence can be used to ensure that the user device requesting access to the lock box is within a geographic area of the lock box. For example, requesting access to the lock box can require that the user allows an application running on the user device to access a GPS service on the user device.

In some implementations, the geo-fence can be further used to notify the seller when the user is approaching the residence for viewing.

Once the user is authenticated, the server 204 adds an entry record 212 to a distributed ledger 206 (for example, a blockchain system) indicating that the user has entered the residence associated with the lock box. Then the server 204 sends access key to the user device 202.

The access key can be a message allowing access to the residence signed by a private key of the server 204. To prevent replay attacks, the message can include non-repeated information such as a system timestamp that includes the date and time that the access was granted and/or a cryptographic nonce.

The user device 202 forwards the access key to the lock box 208. The lock box 208 verifies that the lock key message has been signed by the server 204. In some implementations, the lock box 208 verifies that non-repeating information (such as the time that the request was accessed) is valid (for example, a timestamp including the access key message is within a predetermined range of the current time).

Additionally, the access key message can include information that identifies the lock box, for example, a lock box serial number or reference number. The lock box can check the message to ensure that the number in the message matches the number in the lock box. In some implementations, the access key may be encrypted using a public key associated with the lock box 208. The lock box can decrypt the message using the private key associated with the lock box 208. The lock box can contain a low-power GPS chip, and its current latitude and longitude coordinates can be used to check that the latitude/longitude coordinates included in the access key message are within a pre-defined distance of the latitude/longitude coordinates of the lock box at that point in time. In some implementations, the lock box geolocation can be compared against the user device's geolocation. The user's device geolocation can be required to be within a certain defined radius. Furthermore, it is not necessary for the lock box itself to be equipped with a GPS chip as its location is known to the server (for example, the address to which the lock box is secured) when it was first programmed and added to the ledger by the owner's device.

Once the lock box 208 verifies that the access key message is valid, the lock box 208 opens, allowing the user to access the key.

Once the user is finished viewing the residence, the user reopens the lock box to replace the key. Opening the lock box occurs in the same fashion as described above, however, when the server receives the request to access the lock box, the server 204 can add an exit record 214 to the distributed ledger 206 indicating the user has finished viewing the residence. The server 204 can notify the seller 210 that the user has finished viewing the residence and the seller 210 can return to the residence. In some scenarios, the lock box is left open while viewing the residence. After viewing the residence the key is returned; then, the lock box is closed. In some implementations, the smart lock box may require the closure after the key is retrieved to perform the open/close action again upon key return. For example, the door of the lock box may include springed hinges that automatically close the lock box.

In some implementations, the ledger entries can be accessed and can be used to generate a report or user interface which shows the owner or other authorized party how many people visited the property over time. This information can be used to provide a measure of the popularity of the residence and trends over time.

In some implementations, the user can indicate on the user device 202 whether they are accessing the lock box to view the residence or if they have finished viewing the residence as part of the access request. In some implementations, the server 204 assumes the intent of the user based on the access requests (for example, the first request is determined to indicate that the user is viewing the residence, the second request is determined to indicate that the user has finished viewing the residence.)

In some implementations, the system may message the owner if the key is not returned within the agreed upon viewing timeframe. For example, the server can keep a "key retrieved" status upon the viewer getting the key. Near the end of the viewing period, if the key has not been returned, the server can send a message to the owners letting them know that they key has not been returned. In some implementations, the system can send a message to the viewer a predetermined amount of minutes before the end of the viewing window to let the viewer know that the reserved window is ending. In some implementations, the viewer may request additional time to view the residence. The server may send the request to the owner, who may approve or deny the request.

In some implementations, the distributed ledger is only be updated upon a successful visit completion (key received and returned). An intermediary server can track and log when the key was taken from the lock box and when it was returned to the lock box, updating the ledger once the entire transaction concludes. In this manner, the server can handle and help address any possible error or exception scenarios (for example, the lock being improperly closed, or the viewer requesting and extending the viewing time outside of the initial agreed upon window) before updating the ledger so that each ledger entry is clean and coherent.

To provide some basic context into blockchain technologies, in general, a blockchain is a public or private ledger of all transactions that have been executed in one or more contexts (e.g., negotiable instrument transactions, digital currency transactions, access determinations, instances of providing access, calls to a call center, customer service reps signing into a call center etc.). A blockchain can grow as completed blocks are added with a new set of transactions. In some examples, a single block is provided from multiple transactions (e.g., multiple callers into a call center). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network can use all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains can also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes can compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner can be required to produce hundreds or thousands of hash values before any one miner provides a qualifying hash value (e.g., at least the first four characters of the hash value are each zero).

The entry records 212 and exit record 214 on the distributed ledger 206 can be used to verify and measure interest in the residence associated with the lock box 208. This information can be helpful to the owner and buyers in determining a fair price for the property.

Figure 3:
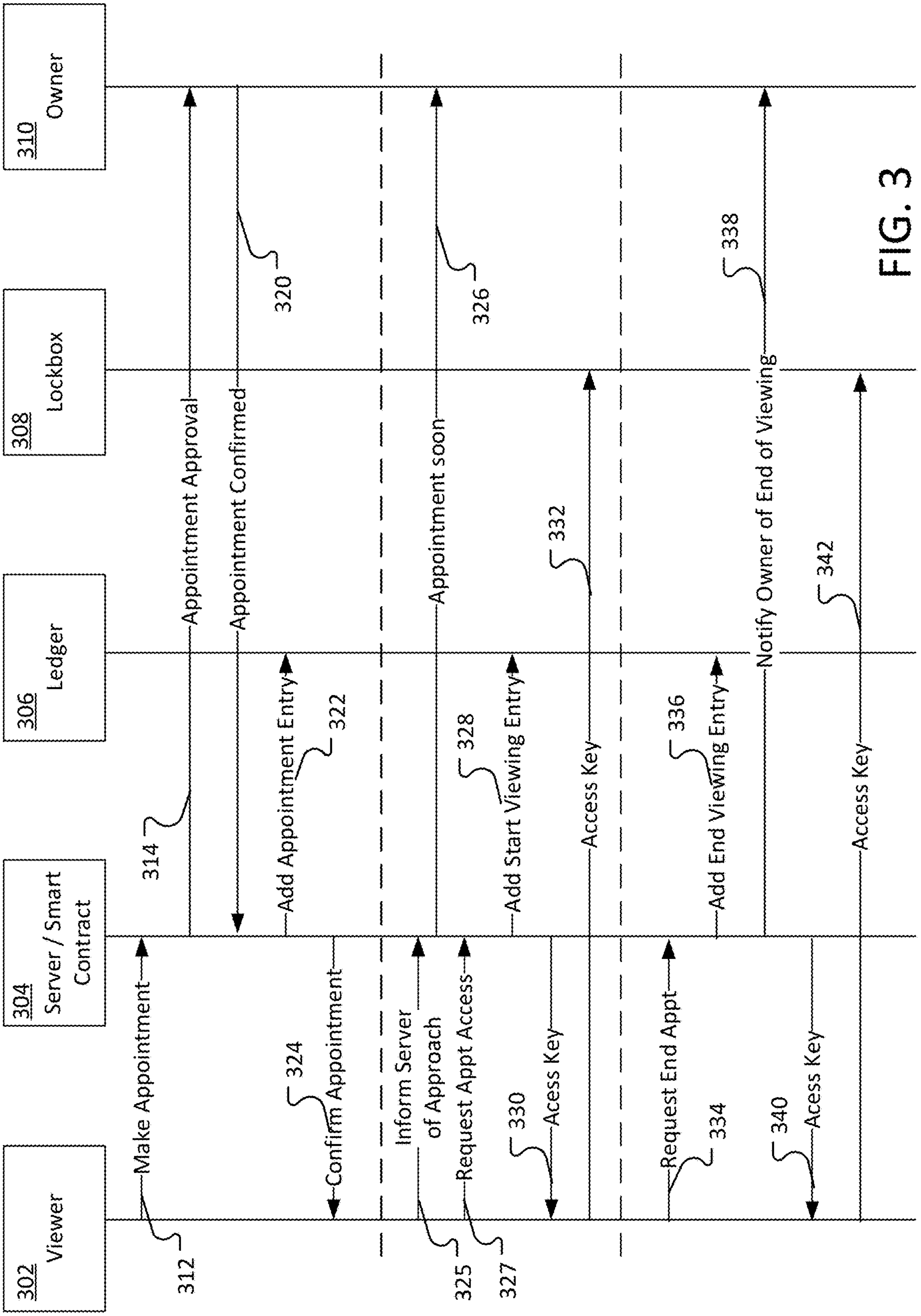
FIG. 3 is a sequence diagram illustrating an example process for making an appointment to view a residence, viewing the residence, and returning the key once the viewing is complete.

FIG. 3 is a sequence diagram illustrating an example process for making an appointment to view a residence, viewing the residence, and returning the key once the viewing is complete.

The user 203 (or the user device of the user) contacts the server 304 to make an appointment 312. In this example, the particular lock box 308 is associated with the residence. For example, the server 304 can store a record that associates the particular lock box with the particular address.

The server 304 sends a message to the owner 310 to approve the appointment 314. The appointment approval can be sent, for example, using a push notification, SMS message, or other communication mechanism.

The owner 310 can approve or reject the appointment. In this example, the owner 310 approves and confirms the appointment 320.

The server 304 adds an appointment entry 322 to the ledger 306. In some implementations, the appointment entry can be stored in a location that is not publicly available (for example, to protect the privacy of the owner). The appointment can be stored without specific information that can be used to identify the location of the residence to be viewed.

The server 304 sends an appointment confirmation 324 to the user 302.

At the time of the appointment, the user can inform the server 304 that he is approaching the home 325. This signal may be sent automatically based on a configurable distance.

The server 304 may send a message (such as an SMS message or push notification) to the owner 310 informing the owner that the viewer is approaching and the user should depart the property.

The user can approach the lock box and request access for the appointment 327. The server 304 can verify that the user 302 has an appointment and, after verifying the appointment, the server can provide an access key to the user.

When the user device receives the access key, it sends the access key to the lock box. When the lock box receives the access key, it verifies the key as described above.

After viewing the residence, the user sent a request and the appointment to the server. The server can verify that the user has been authorized to enter the residence (for example, that the user has made an approved appointment). After verifying that the user has been authorized to enter the residence, the server adds an end viewing entry to the ledger and notifies the owner that the viewing is complete. The server then sends the access key to the user. The user can then use the access key to open the lock box and return the key to the residence.

Figure 4:
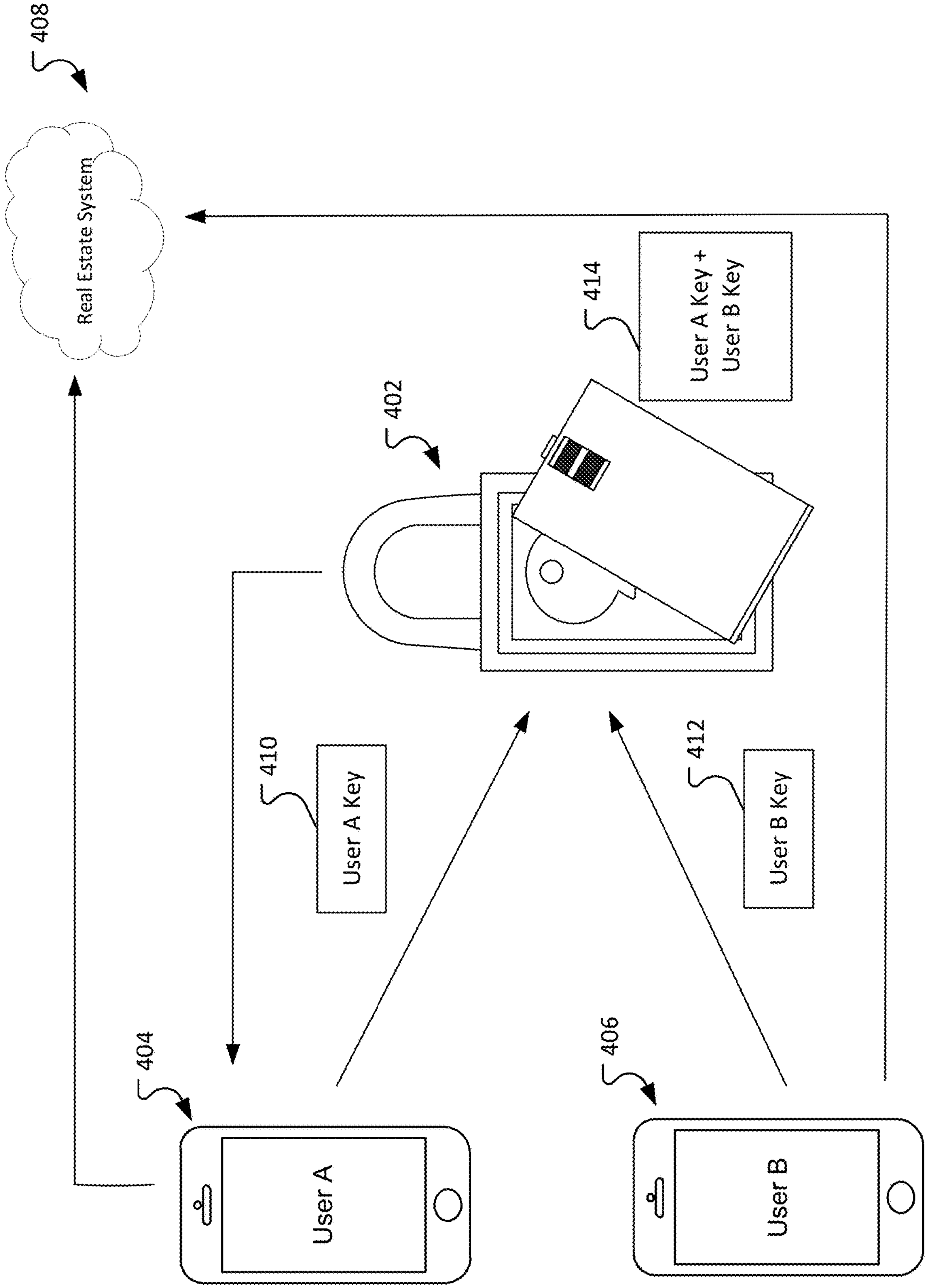
FIG. 4 illustrates an environment in which two user devices are required to open a smart lock box 402.

FIG. 4 illustrates an environment in which two user devices are required to open a smart lock box 402. In some scenarios, it can be desirable to require two individuals to be present in order to open the lock box. The individuals may have similar or different platform access rights designation. For example, an owner of the residence can wish that the residence not be shown unless a real estate agent is present.

In this example, the real estate agent has a user device 404 and the potential buyer has a user device 406. Each user device obtains an access key from the real estate system 408. The real estate system can include, for example, a server and a distributed ledger. As described above, in some implementations, the functionality provided by the server can be implemented by a smart contract accessible from the distributed ledger.

The real estate system 408 provides a portion of the access key to the user device 404 and the user device 406. Each portion of the key (represented by User A key 410 and the User B key 412) is digitally signed by the real estate system and each portion can be independently verified as an authentic key by the lock box 402.

When the lock box 402 receives both keys, the lock box 402 combines the two keys together to get the unlock access code. If the code matches then the lock box opens and provides access to the key.

In some implementations, different users may be identified into different groups, for example, one group may be for real estate agents and another group may be for homebuyers. It may require individuals from different groups in order to open the lock box.

Figure 5:
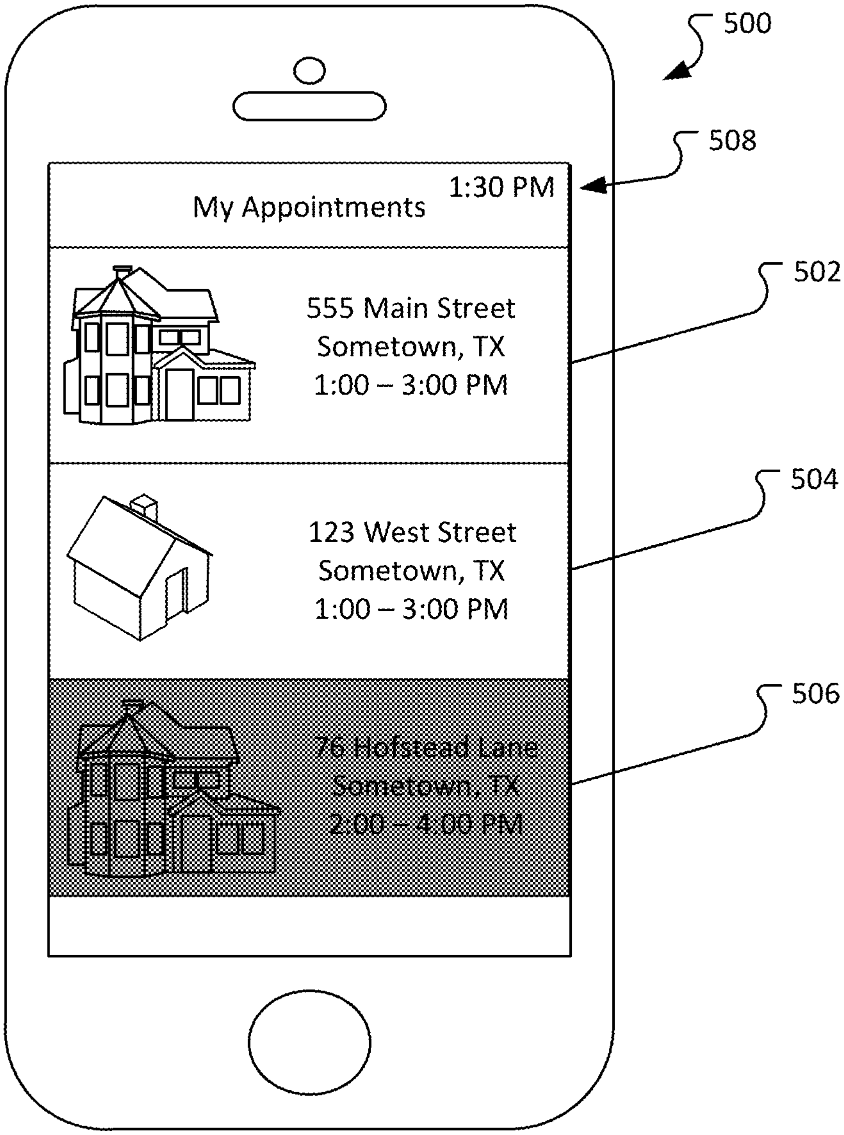
FIG. 5 illustrates an example of a user interface on the user device of a user who is viewing residences.

FIG. 5 illustrates an example of a user interface on the user device of a user who is viewing residences. The user device 500 includes a user interface that displays the appointments that the user has scheduled. In this example, the user has scheduled three appointments, a first appointment is from 1:00-3:00 PM at 555 Main Street (entry 502), a second appointment is from 1:00-3:00 PM at 123 West Street (entry 504), and a third appointment from 2:00-4:00 PM at 76 Hofstead Lane (entry 506).

In this example, the user can request access to a residence by selecting the residence on the user interface. In this example, entry 506 is disabled and cannot be selected because the current time 508 is not within the appointment time (here, 2:00-4:00 PM).

Figure 6:
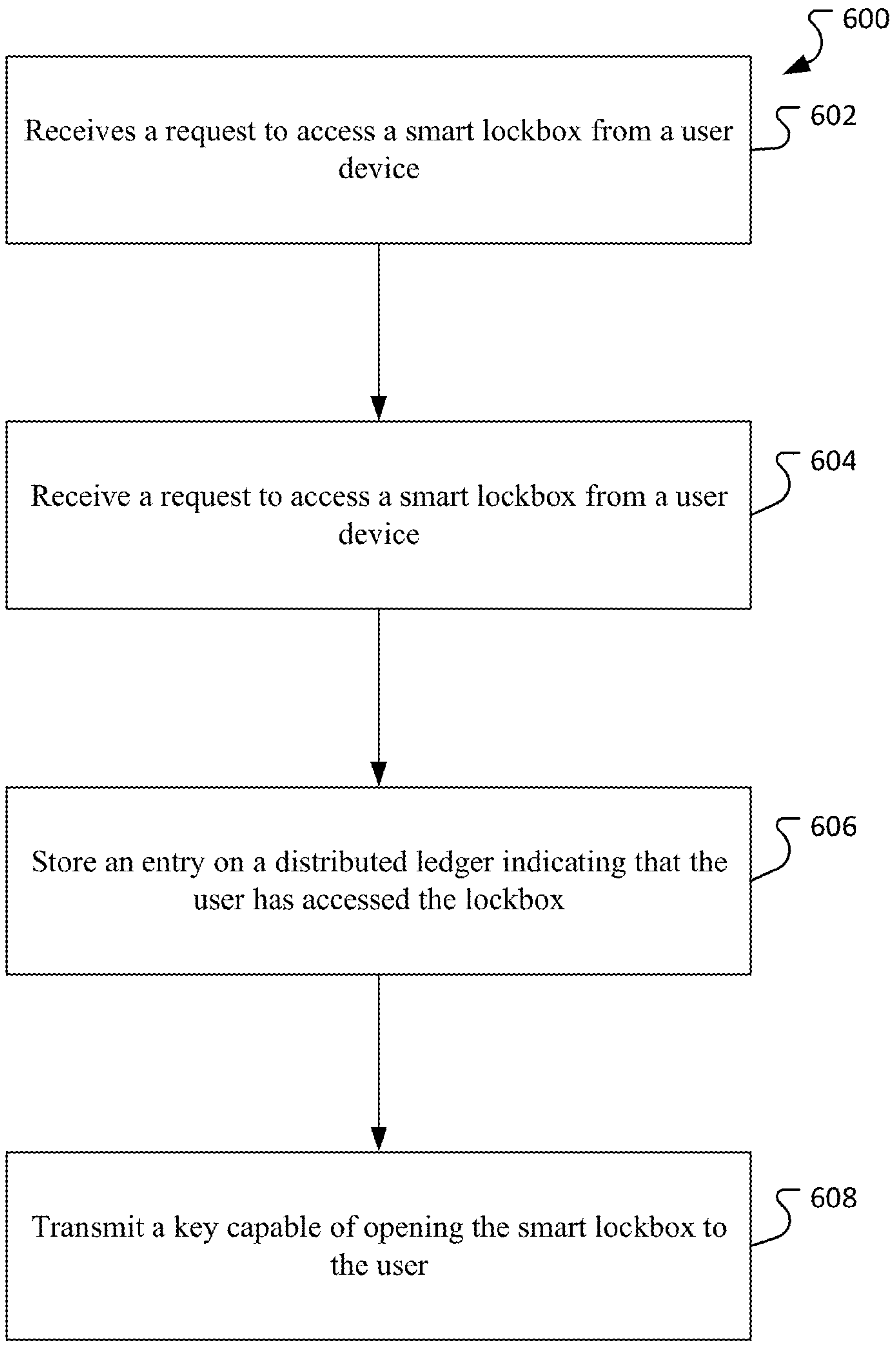
FIG. 6 is a flowchart of an example process for using a smart lock box.

FIG. 6 is a flowchart of an example process 600 for using a smart lock box. The process 600 can be performed by a computer system, for example, the server 204 of FIG. 2.

The process 600 receives 602 a request to access a smart lock box from a user device.

The process 600 receives 602 a request to access a smart lock box from a user device.

The process 600 stores 606 an entry on a distributed ledger indicating that the user has accessed the lock box. and The process 600 transmits 608 a key capable of opening the smart lock box to the user.

Figure 7:
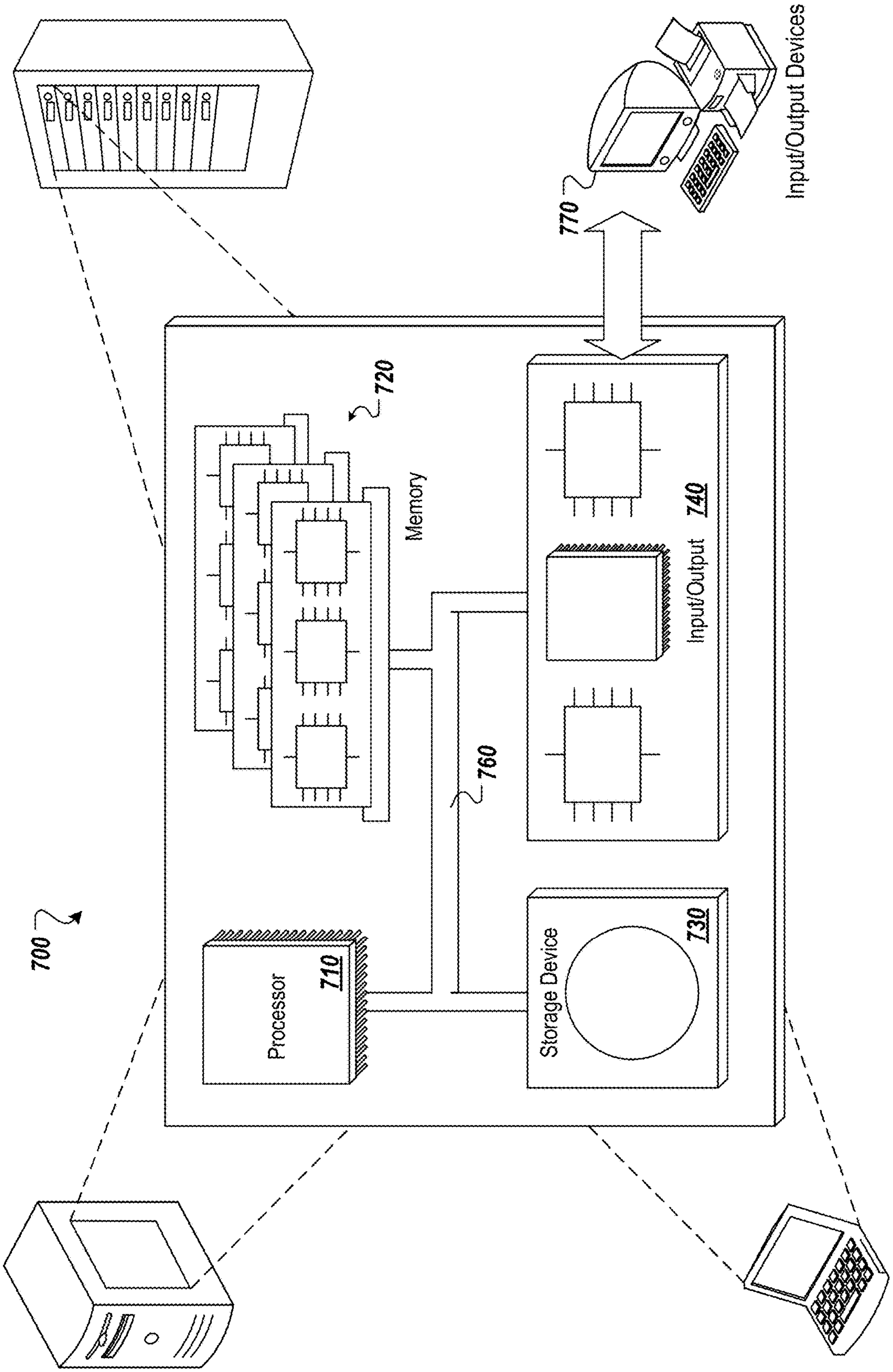
FIG. 7 depicts an example computing system, according to implementations of the present disclosure.

FIG. 7 depicts an example computing system, according to implementations of the present disclosure. The system 700 can be used for any of the operations described concerning the various implementations discussed herein. For example, the system 700 can be included, at least in part, in one or more of the SR device 108, the analysis device(s) 114, and the user device 126, and/or another computing device(s) or system(s) described herein. The system 700 can include one or more processors 710, a memory 720, one or more storage devices 730, and one or more input/output (I/O) devices 750 controllable through one or more I/O interfaces 740. The various components 710, 720, 730, 740, or 750 can be interconnected through at least one system bus 760, which can enable the transfer of data between the various modules and components of the system 700.

The processor(s) 710 can be configured to process instructions for execution within the system 700. The processor(s) 710 can include single-threaded processor(s), multi-threaded processor(s), or both. The processor(s) 710 can be configured to process instructions stored in the memory 720 or on the storage device(s) 730. The processor(s) 710 can include a hardware-based processor(s) each including one or more cores. The processor(s) 710 can include general purpose processor(s), special purpose processor(s), or both.

The memory 720 can store information within the system 700. In some implementations, the memory 720 includes one or more computer-readable media. The memory 720 can include any number of volatile memory units, any number of non-volatile memory units, or both volatile and non-volatile memory units. The memory 720 can include read-only memory, random access memory, or both. In some examples, the memory 720 can be employed as active or physical memory by one or more executing software modules.

The storage device(s) 730 can be configured to provide (e.g., persistent) mass storage for the system 700. In some implementations, the storage device(s) 730 can include one or more computer-readable media. For example, the storage device(s) 730 can include a floppy disk device, a hard disk device, an optical disk device, or a tape device. The storage device(s) 730 can include read-only memory, random access memory, or both. The storage device(s) 730 can include one or more of an internal hard drive, an external hard drive, or a removable drive.

One or both of the memory 720 or the storage device(s) 730 can include one or more computer-readable storage media (CRSM). The CRSM can include one or more of an electronic storage medium, a magnetic storage medium, an optical storage medium, a magneto-optical storage medium, a quantum storage medium, a mechanical computer storage medium, and so forth. The CRSM can provide storage of computer-readable instructions describing data structures, processes, applications, programs, other modules, or other data for the operation of the system 700. In some implementations, the CRSM can include a data store that provides storage of computer-readable instructions or other information in a non-transitory format. The CRSM can be incorporated into the system 700 or can be external concerning the system 700. The CRSM can include read-only memory, random access memory, or both. One or more CRSM suitable for tangibly embodying computer program instructions and data can include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 can be supplemented by, or incorporated into, one or more application-specific integrated circuits (ASICs).

The system 700 can include one or more I/O devices 750. The I/O device(s) 750 can include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 can also include one or more output devices such as a display, LED(s), an audio output device (e.g., a speaker), a printer, a haptic output device, and so forth. The I/O device(s) 750 can be physically incorporated in one or more computing devices of the system 700, or can be external with respect to one or more computing devices of the system 700.

The system 700 can include one or more I/O interfaces 740 to enable components or modules of the system 700 to control, interface with, or otherwise communicate with the I/O device(s) 750. The I/O interface(s) 740 can enable information to be transferred in or out of the system 700, or between components of the system 700, through serial communication, parallel communication, or other types of communication. For example, the I/O interface(s) 740 can comply with a version of the RS-232 standard for serial ports, or with a version of the IEEE 1284 standard for parallel ports. As another example, the I/O interface(s) 740 can be configured to provide a connection over Universal Serial Bus (USB) or Ethernet. In some examples, the I/O interface(s) 740 can be configured to provide a serial connection that is compliant with a version of the IEEE 1394 standard.

The I/O interface(s) 740 can also include one or more network interfaces that enable communications between computing devices in the system 700, or between the system 700 and other network-connected computing systems. The network interface(s) can include one or more network interface controllers (NICs) or other types of transceiver devices configured to send and receive communications over one or more networks using any network protocol.

Computing devices of the system 700 can communicate with one another, or with other computing devices, using one or more networks. Such networks can include public networks such as the internet, private networks such as an institutional or personal intranet, or any combination of private and public networks. The networks can include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices can be encrypted or otherwise secured. For example, communications can employ one or more public or private cryptographic keys, ciphers, digital certificates, or other credentials supported by a security protocol, such as any version of the Secure Sockets Layer (SSL) or the Transport Layer Security (TLS) protocol.

The system 700 can include any number of computing devices of any type. The computing device(s) can include, but are not limited to: a personal computer, a smartphone, a tablet computer, a wearable computer, an implanted computer (e.g. a subdermal), a mobile gaming device, an electronic book reader, an automotive computer, a desktop computer, a laptop computer, a notebook computer, a game console, a residence entertainment device, a network computer, a server computer, a mainframe computer, a distributed computing device (e.g., a cloud computing device), a microcomputer, a system on a chip (SoC), a system in a package (SiP), and so forth. Although examples herein can describe computing device(s) as physical device(s), implementations are not so limited. In some examples, a computing device can include one or more of a virtual computing environment, a hypervisor, an emulation, or a virtual machine executing on one or more physical computing devices. In some examples, two or more computing devices can include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification can be realized in digital electronic circuitry, or in computer software, firmware, or hardware, including the structures disclosed in this specification and their structural equivalents, or in combinations of one or more of them. Implementations can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term “computing system” encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any appropriate form of programming language, including compiled or interpreted languages, and it can be deployed in any appropriate form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor can receive instructions and data from a read only memory or a random access memory or both. Elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations can be realized on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any appropriate form of sensory feedback, e.g., visual feedback, auditory feedback, or tactile feedback; and input from the user can be received in any appropriate form, including acoustic, speech, or tactile input.

Implementations can be realized in a computing system that includes a back end component, e.g., as a data server, or that includes a middleware component, e.g., an application server, or that includes a front end component, e.g., a client computer having a graphical UI or a web browser through which a user can interact with an implementation, or any appropriate combination of one or more such back end, middleware, or front end components. The components of the system can be interconnected by any appropriate form or medium of digital data communication, e.g., a communication network. Examples of communication networks include a local area network (“LAN”) and a wide area network (“WAN”), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what can be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some examples be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications can be made without departing from the spirit and scope of the disclosure. For example, various forms of the flows shown above can be used, with steps re-ordered, added, or removed. Accordingly, other implementations are within the scope of the following claims.

The invention claimed is:

1. A lock box comprising:
- a locking mechanism configured to securely hold a cover over a compartment, the locking mechanism being installed at a location;
- a receiver/sensor capable of receiving/detecting signals from a user device; and
- a processor configured to:
  - identify an access message in one or more received signals;
  - verify that the access message was provided by an authorized party;
  - add an entry record to a blockchain of a blockchain system to indicate that the authorized party is entering the location, wherein the blockchain system includes a plurality of interconnected computing devices, each computing device maintaining a copy of the blockchain; and
  - cause the locking mechanism to be released to allow the authorized party to enter the location in response to verifying that the access message was provided by the authorized party.

2. The lock box of claim 1, wherein the access message comprises an encrypted access message, and the processor is further configured to decrypt the encrypted access message using a private key corresponding to the lockbox.

3. The lock box of claim 1, wherein verifying that the access message was provided by the authorized party comprises comparing a timestamp of the access message to the current time.

4. The lock box of claim 1, wherein the one or more received signals comprise a signal received from the user device and a signal received from at least one other user device.

5. A computer-implemented method comprising:
- receiving a request to access a smart lock box from a user device;
- authenticating, in response to receiving the request, the user device by sending challenge prompt data representing a challenge prompt to the user device and receiving response data to the challenge prompt;
- verifying that the user of the user device is authorized to access the smart lock box;
- adding an entry record to a blockchain of a blockchain system to indicate that the user has accessed the smart lock box, wherein the blockchain system includes a plurality of interconnected computing devices, each computing device maintaining a copy of the blockchain; and
- transmitting a key capable of opening the smart lock box to the user device.

6. The computer-implemented method of claim 5, wherein verifying that the user device is authorized to access the lock box comprises verifying that the user device is within a predetermined distance from the lock box and verifying that the lock box is currently located within a predefined authorized geolocation at the time of access.

7. The computer-implemented method of claim 5, wherein verifying that the user device is authorized to access the lock box comprises verifying that the user has scheduled an appointment to view a location associated with the lock box.

8. The computer-implemented method of claim 5, further comprising:
- determining to send a message to an individual that the individual can depart/return to a location associated with the lock box; and
- sending the message to the individual.

9. The computer-implemented method of claim 5, wherein the lock box requires receiving the key including an access message signed by a private key from two or more user devices in order to open.

10. A non-transitory computer-readable medium storing instructions which, when executed by at least one processor, cause the at least one processor to perform operations comprising:
- receiving a request to access a smart lock box from a user device;
- authenticating, in response to receiving the request, the user device by sending challenge prompt data representing a challenge prompt to the user device and receiving response data to the challenge prompt;
- verifying that the user of the user device is authorized to access the smart lock box;
- adding an entry record to a blockchain of a blockchain system to indicate that the user has accessed the smart lock box, wherein the blockchain system includes a plurality of interconnected computing devices, each computing device maintaining a copy of the blockchain; and
- transmitting a key capable of opening the smart lock box to the user device.

11. The non-transitory computer-readable medium of claim 10, wherein verifying that the user device is authorized to access the lock box comprises verifying that the user device is within a predetermined distance from the lock box and verifying that the lock box is currently located within a predefined authorized geolocation at the time of access.

12. The non-transitory computer-readable medium of claim 10, wherein verifying that the user device is authorized to access the lock box comprises verifying that the user has scheduled an appointment to view a location associated with the lock box.

13. The non-transitory computer-readable medium of claim 10, wherein the operations further comprise:
- determining to send a message to an individual that the individual can depart/return to a location associated with the lock box; and
- sending the message to the individual.

14. The non-transitory computer-readable medium of claim 10, wherein the lock box requires receiving a key including an access message signed by a private key from two or more user devices in order to open.

15. A system comprising:

at least one processor; and a memory communicatively coupled to the at least one processor, the memory storing instructions which, when executed by the at least one processor, cause the at least one processor to perform operations comprising:

receiving a request to access a smart lock box from a user device;

authenticating, in response to receiving the request, the user device by sending challenge prompt data representing a challenge prompt to the user device and receiving response data to the challenge prompt;

verifying that the user of the user device is authorized to access the smart lock box;

adding an entry record to a blockchain of a blockchain system to indicate that the user has accessed the smart lock box, wherein the blockchain system includes a plurality of interconnected computing devices, each computing device maintaining a copy of the blockchain; and transmitting a key capable of opening the smart lock box to the user device.

16. The system of claim 15, wherein verifying that the user device is authorized to access the lock box comprises verifying that the user device is within a predetermined distance from the lock box and verifying that the lock box is currently located within a predefined authorized geolocation at the time of access.

17. The system of claim 15, wherein verifying that the user device is authorized to access the lock box comprises verifying that the user has scheduled an appointment to view a location associated with the lock box.

18. The system of claim 15, wherein the operations further comprise:

determining to send a message to an individual that the individual can depart/return to a location associated with the lock box; and sending the message to the individual.

19. The system of claim 15, wherein the lock box requires a key including an access message signed by a private key from two or more user devices in order to open.

* * * * *